(12) United States Patent
Kerr et al.

(10) Patent No.: US 7,101,643 B2
(45) Date of Patent: Sep. 5, 2006

(54) POLYMERIC ELECTROLYTES BASED ON HYDROSILYATION REACTIONS

(75) Inventors: John Borland Kerr, Oakland, CA (US); Shanger Wang, Fairfield, CA (US); Jun Hou, Painted Post, NY (US); Steven Edward Sloop, Berkeley, CA (US); Yong Bong Han, Berkeley, CA (US); Gao Liu, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/160,604

(22) Filed: May 31, 2002

(65) Prior Publication Data

US 2003/0059682 A1    Mar. 27, 2003

Related U.S. Application Data

(60) Provisional application No. 60/294,724, filed on May 31, 2001, provisional application No. 60/294,954, filed on May 31, 2001.

(51) Int. Cl.
*H01M 6/18*  (2006.01)
*C08G 77/12*  (2006.01)
*C08L 83/04*  (2006.01)

(52) U.S. Cl. ............. 429/313; 429/317; 429/306; 528/31; 524/861; 525/326.5

(58) Field of Classification Search ........ 429/313, 429/317, 306, 302, 189, 314; 528/10, 12, 528/31; 524/858, 861; 525/326.5, 231, 525/209
See application file for complete search history.

(56) References Cited

U.S. PATENT DOCUMENTS

| | | | |
|---|---|---|---|
| 5,102,751 A | 4/1992 | Narang et al. | |
| 5,112,512 A | 5/1992 | Nakamura | |
| 5,173,205 A | 12/1992 | Marchese et al. | |
| 5,501,920 A | 3/1996 | Andrei et al. | |
| 5,648,186 A | 7/1997 | Daroux et al. | |
| 5,747,604 A * | 5/1998 | Allcock et al. | 525/417 |
| 5,755,985 A | 5/1998 | Vallee et al. | |
| 5,873,915 A | 2/1999 | Andrei et al. | |
| 5,919,442 A * | 7/1999 | Yin et al. | 424/78.18 |
| 5,968,681 A | 10/1999 | Miura et al. | |
| 5,998,559 A | 12/1999 | Narang et al. | |
| 6,063,522 A | 5/2000 | Hamrock et al. | |
| 6,127,481 A * | 10/2000 | Janssen et al. | 525/106 |
| 6,159,389 A | 12/2000 | Miura et al. | |
| 6,162,563 A | 12/2000 | Miura et al. | |
| 6,201,071 B1 | 3/2001 | Miura et al. | |
| 6,239,204 B1 | 5/2001 | Miura et al. | |
| 6,284,906 B1 * | 9/2001 | Paulasaari et al. | 556/451 |
| 6,365,294 B1 | 4/2002 | Pintauro et al. | |
| 2003/0008932 A1 * | 1/2003 | Soane et al. | 521/56 |

OTHER PUBLICATIONS

Rietman, et al., Journal of Polymer Science: Part C: Polymer Letters, vol. 28, pp. 187-191 (1990).
Zhou, et al., Polymer Communications, vol. 30, pp. 52-55, (Feb. 1990).

* cited by examiner

*Primary Examiner*—Raymond Alejandro
(74) *Attorney, Agent, or Firm*—Charles R. Nold; Adrienne Yeung

(57) ABSTRACT

New polymer electrolytes were prepared by in situ cross-linking of allyl functional polymers based on hydrosilation reaction using a multifunctional silane cross-linker and an organoplatinum catalyst. The new cross-linked electrolytes are insoluble in organic solvent and show much better mechanical strength. In addition, the processability of the polymer electrolyte is maintained since the casting is finished well before the gel formation.

9 Claims, 17 Drawing Sheets

MA2: m=0.98, n=0.02
MA5: m=0.95, n=0.05
MA10: m=0.90, n=0.10

Effect of Cross-linking on Elastic Modulus of Polymer Electrolytes Films

POLYMERIC ELECTROLYTES BASED ON HYDROSILYATION REACTIONS

CROSS REFERENCE TO RELATED APPLICATIONS

This application claims priority to U.S. provisional application Ser. No. 60/294,954, filed May 31, 2001 and U.S. provisional application Ser. No. 60/294,724, filed May 31, 2001, the contents of both applications are hereby incorporated by reference in their entirety. This application is related to U.S. Ser. No. 10/160,495, filed May 31, 2002, currently copending, the contents of which are hereby incorporated by reference in their entirety.

STATEMENT REGARDING FEDERALLY SPONSORED RESEARCH OR DEVELOPMENT

This invention was made with government support under Grant (Contract) No. DE-AC03-76F00098 awarded by The United States Department of Energy. The government has certain rights to this invention.

BACKGROUND OF THE INVENTION

Since the first introduction of polymer electrolytes as a new class of solid electrolyte for energy storage applications, studies of all solid polymer electrolytes with ionic conductivity of $10^{-5}$–$10^{-2}$ S/cm at ambient temperatures have received much attention owing to the potential applications in various electronic devices. Most of the previous efforts were based on the poly(oxyethylene) complexes with inorganic salts such as $LiClO_4$, $LiSO_3CF_3$ and most recently, $LiN(SO_2CF_3)_2$, these systems are often denoted as binary electrolytes as both anion and cation contribute to the ion transportation. To achieve the practical applications of polymer electrolytes, the polymer has to satisfy several rigorous requirements: (1) bear strong ion coordinating sites to solvate inorganic salts, (2) must be amorphous with substantial segmental flexibility, (3) have durable mechanical and electrochemical stability for specific application environments. Numerous attempts have been tried to increase the conductivity by making PEO derived polymers, such as block copolymers, comb-branch polymers containing methylated poly(ethylene glycol) side chains, polymer networks and adding plasticizer or additives to break down the crystalline phase, which is detrimental to the transportaton of charge carriers. In all these cases, however, the essential problem related to the efficiency of rechargeable polymer lithium batteries, i.e., polarization and very low $Li^+$ transference number is inevitable with a binary salt electrolyte. It is, therefore, desirable to properly design and synthesize polymers with the anion attached covalently to the polymer chain. The instant invention solves the aforementioned problems. Compared with binary systems, single-ion conductors show constant dc conductivity during dc polarization and shall have $Li^+$ cation transfer number of 1. Normally, single-ion conductors have much lower conductivity than binary salt electrolytes under the same conditions, in the range of $10^{-8}$ to $10^{-6}$ S cm$^{-1}$ at 25° C. for alkali metal cations, due to the ion paring to the immobile anion. It is therefore necessary to develop new materials with improved conductivity, e.g., $10^{-4}$ S cm$^{-1}$ at room temperature, if they are to be used for lithium rechargeable batteries.

Hyper-comb-branched polymer conjugates are known in the art, for example U.S. Pat. No. 5,919,442 to Yin et al. Therein are described a class of hyper comb-branched polymers conjugates with carrier materials. This reference is incorporated herein by reference in its entirety.

One major limitation for comb branched polymers is the lack of mechanical strength to form free standing films when still soluble, and the lack of processability when mechanically strong. Various chemical and physical means have been applied to solve this issue, including using a post-cross-linking process. For instance, Andrei and coworkers (Solid State Ionics 72 (1994) 140–146), the contents of which are hereby incorporated by reference in its entirety, prepared a comb branched copolymer incorporating allyl functional groups at the end of the side chains. These allyl groups were allowed to undergo a hydrosilation reaction with excess triethoxysilane in the presence of $H_2PtCl_6H_2O$ catalyst. The copolymer now carrying triethoxysilyl groups was dissolved, along with lithium salt and acidified diethylene glycol, in a solvent and was cured in the shape of a thin membrane. Transparent and easily handled membranes were obtained with good mechanical properties and no penalty due to the cross-linking in terms of conductivity. While the post-cross-linking strategy is appealing, there are some problems with this prior art polymeric electrolyte design:

1) The concentration of allyl groups in the polymer is very low, which means an excess amount of the other reactant has to be used in order to obtain acceptable conversion of the allyl groups. After the completion of hydrosilation, the excess silane is now an impurity and should be removed as completely as possible. However, triethoxysilane employed has a relative high boiling point (134° C.), which makes it impossible to completely remove the excess. This excess silane will affect the electrochemical properties of the electrolyte.

2) Since the mechanism of the cross-linking involves the breaking and reformation of Si—O—C bonds, the chemical stability of this network is in question. These linkages are subject to hydrolysis due to moisture. Any unreacted, acidified diethylene glycol will mean introduction of hydroxyl groups in the membrane and would react with lithium metal in a cell.

3) The catalyst used contains trace amounts of water that should be avoided.

SUMMARY OF THE INVENTION

This invention provides an improved polymer membrane that can be prepared avoiding the above-mentioned limitations of the prior art. A co-polymer precursor can be made as described in the prior art, and in accordance with FIG. 1. As a non-limiting example, allyl vinyl ether C can be made in a straightforward way, since allyl alcohol A is available, diethylene glycol chloro vinyl ether B can be made by chlorination of commercially available diethylene glycol vinyl ether. Longer allyl vinyl ethers can be prepared similarly. By copolymerizing C with D, a viscous copolymer E is made. With this copolymer, a polymer electrolyte is made with a lithium salt in an organic solvent. The next reaction is a post-cross-linking process to make free standing films. This involves the use of a volatile multifunctional silane F and an organic Pt compound.

BRIEF DESCRIPTION OF THE DRAWINGS

The present invention will be readily understood by the following detailed description in conjunction with the accompanying drawings.

DETAILED DESCRIPTION OF THE PREFERRED EMBODIMENTS

Figure 1:
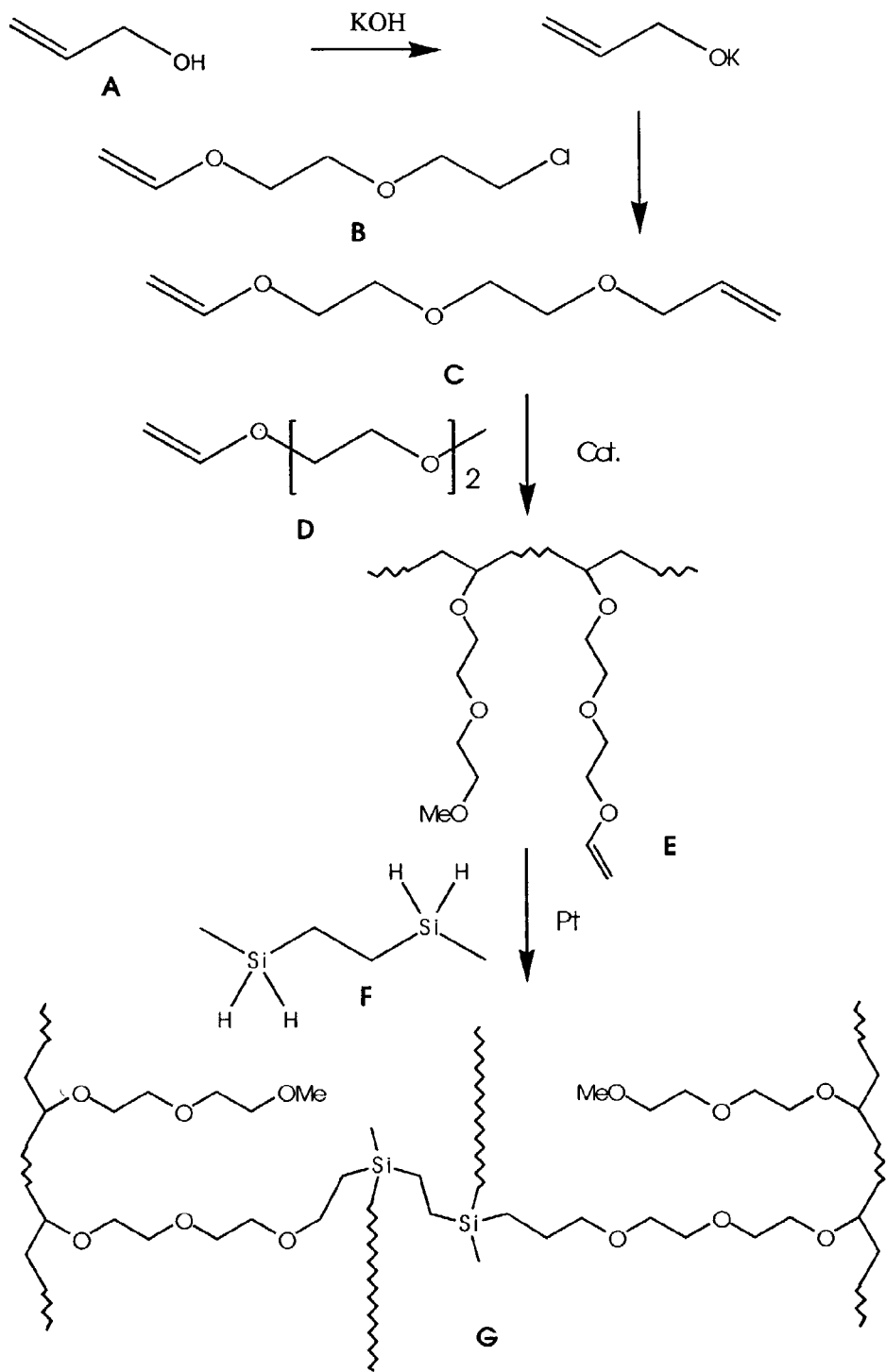
FIG. 1 A reaction scheme in accordance with one embodiment of the invention

Before describing the present invention in detail, it is to be understood that this invention is not limited to particular salts, methods of synthesis, solvents, or the like, as such may vary. It is also to be understood that the terminology used herein is for the purpose of describing particular embodiments only, and is not intended to be limiting.

The instant invention provides for a polymeric electrolyte structure comprising the hydrosilyation reaction product of a comb-branch polymer having unconjugation in the side chain and a silane compound in the presence of an organoplatinum catalyst. Preferably the comb-branch polymer has a backbone selected from the group consisting of poly(alkylenes), polyacrylates, polymethacrylates, polyalkylmethacrylates, polystyrene, polytetrahydrofuran, poly(ethylene glycol), poly(vinyl acetate), polysiloxane, poly(ethylene oxide), poly(propylene oxide), polyether and polyepoxide.

Preferably, the comb-branch polyepoxide ether has the following structure:

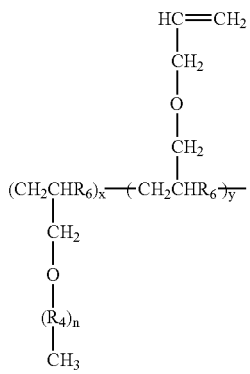

wherein $R_4$ comprises $-(CH_2CH_2O)-$, $-(CH_2CH_2CH_2O)-$, $-(CH_2CH_2CH_2CH_2O)-$, $-(CH_2CHR_5O)-$, where $R_5$ is $CH_3-$, $CH_3O-$ or $CH_3OCH_2CH_2O-$, where $R_6$ is $-CH_2$, O, NH, Si or P, n is an integer from about 2 to about 20, and x and y are chosen such that the ratio x/y is from 1 to 30. Preferably the ratio x/y is less than or equal to 20 and more preferably the ratio x/y is 1, 2.5, 5 or 10. Preferably n is between 2 and 7. Preferably the salt compound is chosen from the group consisting of perfluoroalkylsulfonyl methides and imides, perfluoroalkylsulfonates and alkylsulfonates, where the alkyl group is chosen from the group consisting of lower alkyls and higher alkyls.

Non limiting examples of silane compounds include the following compounds:

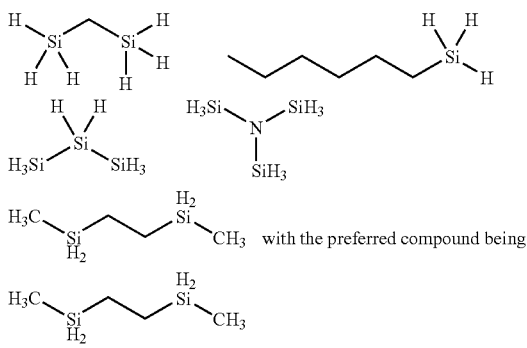

with the preferred compound being

The invention contemplates that the compound has a boiling point low enough to be removed by vacuum. Specifically the boiling point that is less than 140° C.

Dual-ion conductive polymers are defined as having both the anion and cation having mobility in the electrolyte. Single ion conductors have a distinct advantage over dual-ion conductive polymers in that they can charge and discharge more completely, in part because DC polarization does not occur. More particularly, single-ion conducting polymer electrolytes have the capability of exclusively transporting cations, such as lithium, thereby minimizing polarization effects at the electrodes. Further, single-ion conducting electrolytes avoid the condition wherein both the dissociated cation and anion of the metal salt dissolve in the electrolyte and move toward the positive and negative electrodes at the same time, reducing the ion transportation value.

It must be noted that, as used in this specification and the appended claims, the singular forms "a," "tan" and "the" include plural referents unless the content clearly dictates otherwise. Thus, for example, reference to "a polymer" includes mixtures of polymers, and the like.

In this specification and in the claims which follow, reference will be made to a number of terms which shall be defined to have the following meanings:

The term "polymer" is intended to include both oligomeric and polymeric species, i.e., compounds which include two or more monomeric units, which may be a homopolymer or a copolymer. When a single generic structure is shown it is to be understood that the polymers described may contain two or more different monomeric units represented by the single generic structure. A "conductive polymer" is one which possesses conducting as opposed to insulating electrical-transport properties. It is understood that when the term "polymer" is used, it is meant to include comb-branch polymers and dendrimers.

The term "homopolymer" intends a polymer incorporating a single species of monomer units. By contrast, the term "copolymer" refers to a polymer constructed from two or more chemically distinct species of monomer units in the same polymer chain. A "block copolymer" is a polymer which incorporates two or more segments of two or more distinct species of homopolymers or copolymers.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms.

The term "lower alkyl" intends an alkyl group of one to six carbon atoms. The term "fluorinated lower alkyl" intends an alkyl group of one to six carbon atoms in which at least one hydrogen atom, and optionally all hydrogen atoms, are replaced with fluorine atoms.

The term "alkenyl" refers to a branched or unbranched hydrocarbon chain containing from 2 to 24 carbon atoms and at least one double bond. "Lower alkenyl" refers to an alkenyl group of 2 to 6, more preferably 2 to 5, carbon atoms. The term "fluorinated lower alkenyl" intends an alkenyl group of one to six carbon atoms in which at least one hydrogen atom, and optionally all hydrogen atoms, are replaced with fluorine atoms.

The term "alkoxy" as used herein intends an alkyl group bound through a single, terminal ether linkage; that is, an "alkoxy" group may be defined as —OR where R is alkyl as defined above. A "lower alkoxy" group intends an alkoxy group containing one to six, more preferably one to four, carbon atoms.

The term "aryl" as used herein refers to a monocyclic aromatic species of 5 to 7 carbon atoms, and is typically phenyl. Optionally, these groups are substituted with one to four, more preferably one to two, lower alkyl, lower alkoxy, hydroxy, and/or nitro substituents or the like.

The term "aralkylene" is used to refer to moieties containing both alkylene and monocyclic aryl species, typically containing less than about 12 carbon atoms in the alkylene portion, and wherein the aryl substituent is bound to the structure of interest through an alkylene linking group. Exemplary aralkylene groups have the structure —$(CH_2)_j$—Ar wherein j is an integer in the range of 1 to 6.

"Halo" or "halogen" refers to fluoro, chloro, bromo or iodo, and usually relates to halo substitution for a hydrogen atom in an organic compound. Of the halos, fluoro is typically preferred.

"Optional" or "optionally" means that the subsequently described circumstance may or may not occur, and that the description includes instances where said circumstance occurs and instances where it does not. For example, the phrase "optional covalent bond" means that a covalent bond may or may not be present and that the description includes both the instance when the covalent bond is present and the instance when the covalent bond is not present.

The term "organic Pt complex" and "organic Pt compound" and "organic Pt composition" are used interchangably and have the same meaning as used herein.

When reference is made to "vacuum", it is meant that pressure that is 5 torr or less.

It is understood that the terms alkali and alkali earth metals refer to those elements of Group I and Group II, respectively of the periodic table.

It is understood that this invention prefers the use of Li as a cationic species. However, the invention contemplates that any alkali metal, alkali earth metal will suffice. Also contemplated for use as cations are tetraalkyl ammonium and trialkyl ammonium, where the alkyl is a lower alkyl, imidazolium and pyridium cations.

When reference is made to "LITFSI", it is meant lithium bis(trifluoromethylsulfonyl)imide.

When reference is made to "SIC", this means "single ion conductor".

The polymers of the invention may be prepared using conventional techniques well-known to those skilled in the art of synthetic organic chemistry or which may be found in the relevant texts such as in Kirk-Othmer's Encyclopedia of Chemical Technology, in House's Modern Synthetic Reactions, in C. S. Marvel and G. S. Hiers' text, ORGANIC SYNTHESIS, Collective Volume 1, or the like, the contents of which are hereby incorporated by reference.

An advantage over the prior art is that the instant invention does not require the addition of a plasticizer to achieve the conductivities reported herein.

Figure 2:
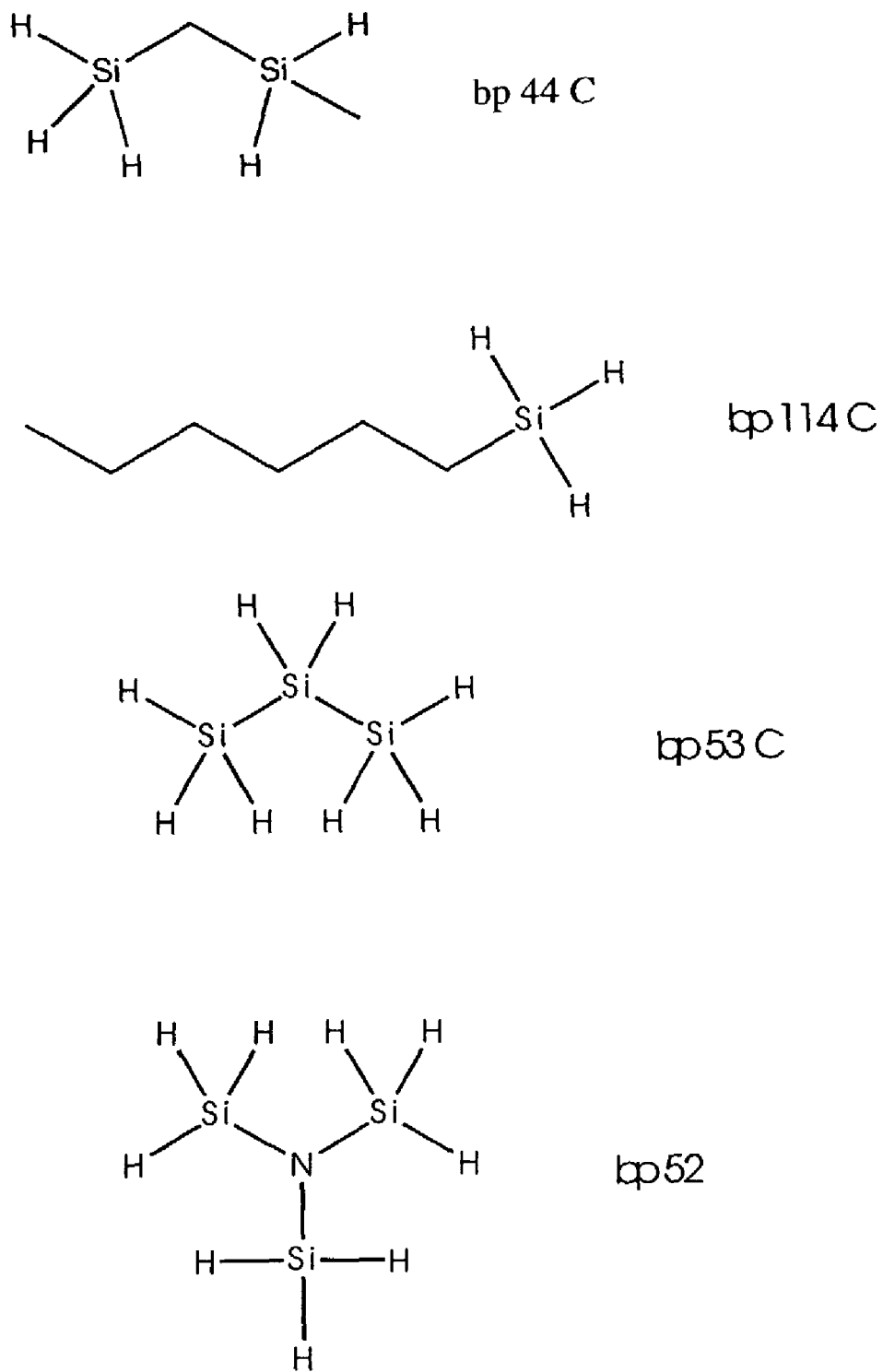
FIG. 2 Some of the silanes available for use in the reaction of the instant invention FIG. 3 A reaction scheme in accordance with another embodiment of the invention FIG. 4 The temperature dependence of the conductivity of two polymer electrolytes FIG. 5 DSC Curves for PPO-XL and PPO-NXL FIG. 6 An example of an interpenetrating network FIG. 7 A general structure of an allyl functional comb-branch poly[methoxyoligo(oxyethylene)methacrylate-co-allylmethacrylate]copolymer FIG. 8 Conductivity measurements conducted using AC impedance spectroscopy FIG. 9 DSC scans for PEPE2/LiTFSI electrolytes with different O/Li ratios FIG. 10 DSC scans for PEPE2X/LiTFSI electrolytes with different O/Li ratios FIG. 11 $T_g$ of PEPE2/LiTFSI and PEPE2X/LiTFSI as a function of O/Li ratio FIG. 12 Conductivity of PEPE2/LiTFSI as a function of temperature FIG. 13 Conductivity of PEPE2X/LiTFSI as a function of temperature FIG. 14 Conductivity of PEPE2/LiTFSI and PEPE2X/LiTFSI as a function of temperature FIG. 15 Elastic modulus of polyepoxide ether electrolytes as a function of frequency FIG. 16 Effect of salt addition of elastic moduli of films shown in FIG. 17

The instant invention solves the following problems present in the prior art:
1. The use of organic Pt complex as catalyst avoids the presence of water.
2. The volatile multifunctional silane will provide cross-linking capability and, when not needed, can be readily removed by applying vacuum.
3. The absence of Si—O—C linkages will assure the long term stability of the formed network G.
4. The copolymer is not limited to a polyvinyl backbone. The backbone can be prepared with poly(alkylenes), polyacrylates, polymethacrylates, polyalkylmethacrylates, polystyrene, polytetrahydrofuran, poly(ethylene glycol), poly(vinyl acetate), polysiloxane, poly(ethylene oxide), poly(propylene oxide), polyether and polyepoxide to provide different degrees of stiffness and consequently mechanical properties.
5. Any ether side groups present are not affected by the cross-linking process. Longer side-chains where the number of ethylene oxide units are between 4 and 10 will provide conductivity and tunable adhesivity to the electrodes. In addition, the system can be optimized by not only changing the lengths of vinyl and allyl vinyl monomers, but also the multifunctional silanes and catalyst. At least six organic Pt catalysts are available. FIG. 2 shows other silanes that are also commercially available and may be used in with the instant invention.

The instant invention prefers the use of volatile multifunctional silane and organoplatinum catalysts. Since the curing process involves only the addition of Si—H bonds to allyl groups and the excess of volatile silane can be easily removed under vacuum, involvement of any by-product will not be expected. In addition, the cross-linked network is built upon stable Si—C bonds rather than the vulnerable Si—O—C linkages.

In the systems of the instant invention, there is substantially no water, thus the polyelectrolyte must provide the means of transport. It must provide the anion and means of solvating the proton so that the proton is not so strongly bound to the anion that it cannot move. The anion needs to be able to move around to some extent and the best architecture for this is a comb-branch or dendritic structure. These structures consist of chains attached to a backbone or to a central nucleus. The advantage of these is that one end is free to move around with a range limited by the length of the chain. At high temperatures the segmental motion of the chain will be considerable so that attached protons may move with the chains and hop from one chain to another with the rate of transfer under the control of the binding strength of the proton to the chain. While not wishing to be bound by any particular principle or theory, this is thought to involve ion-pairing between the proton and the anion.

The strength of the attraction between the proton and the anion depends on the nature of the anion and the nature of the solvating medium. In the presence of water, the proton is solvated by the water molecules, which separate it from the anion. In the absence of water the polyelectrolyte structure must provide the solvating medium for the proton. Hence in the prior art Nafion™ there is poor conductivity in the absence of water as the fluorinated structure provides little solvation for the protons which bind strongly to the sulfonate group as a result.

Since water cannot be bound to the polymer, the next best thing would be alcohol groups or amines. It is a relatively simple matter to introduce alcohol groups into the side chains of a polyelectrolyte. However, since the membrane will be subjected to high temperature in the presence of oxygen then oxidation to carboxylic acids will occur, resulting in an undesired anionic group in the electrolyte. Attachment of pyridine or imidazole to side chains can provide solvating groups that are resistant to oxidation. The imidazole in particular has been found to be resistant to oxidation by hydrogen peroxide, and is preferred for use in this invention. Alternative solvating groups for protons include phosphates, acrylates or carbonates.

A high temperature fuel cell exists in an extreme environment. Prolonged exposure to oxygen at 200° C. is a very rigorous performance requirement. Even the stability of the carbon-fluorine bond is challenged under these conditions, particularly if inefficient reduction of oxygen should lead to generation of hydroxyl radicals. Any scheme to build membranes for high temperature fuel cell operation must consider the long-term stability of the membrane under such conditions. A further advantage of the comb architecture of the instant invention is that reactions with oxygen is likely to lead to bond breaking to yield smaller fragments that may be analyzed for by conventional analytical procedures.

Although the comb branch and dendrimer materials have inherent advantages over the linear polymers in terms of the transport properties, they have very poor mechanical properties, which result from the shapes of the polymers. To be practical the polymers must be cross-linked and this must be achieved after the polymer electrolytes have been cast in the form of a membrane separator or composite electrode. The cross-linking must also be achieved in a way that leaves no reactive groups or residues in the separator that could reduce the cycling efficiency. Further, it is desirable for the cross-linking process to be well controlled. Allcock et al., U.S. Pat. No. 5,747,604 has reported a controlled process polyphosphazene ethers (MEEP) and involves the use of hydrosilylation agents to form cross-links to allyl ether groups incorporated in the polymer in a well-controlled fashion. This reference is expressly incorporated herein by reference in its entirety.

Imides and methides are particularly suitable for this invention. Imide and methide salts have been prepared and used previously for electrolytes, see U.S. Pat. No. 6,063,522, the contents of which are hereby incorporated by reference.

This invention contemplates as useful for the polymer backbone both comb-branch polymers and dendrimers. Dendrimers are known in the art as useful for electrolytes, see U.S. Pat. No. 5,648,186 and U.S. Pat. No. 5,919,442, the contents of which are incorporated by reference in its entirety.

When designing the cross-linking strategy of the instant invention, the inventors focused on potential chemical and electrochemical stability of the resulting electrolyte. There are a number of chemical pathways to realize cross-linking. However, since lithium metal is extremely reactive towards organic functional groups such as hydroxyl and amine, most of these methods are not suitable for making polymer electrolytes aimed at lithium battery application.

Figure 3:
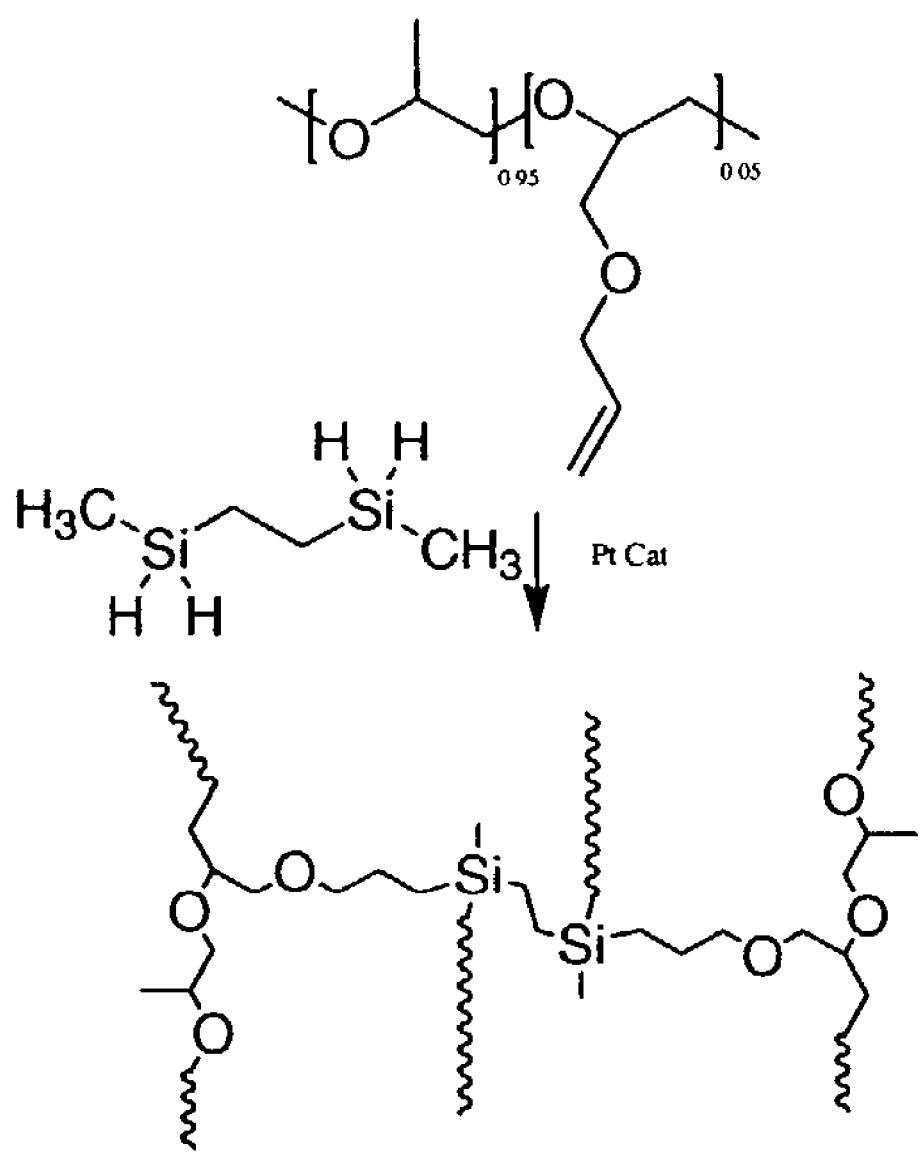

After completion of hydrosilation, the excess triethoxysilane becomes impurity and should be removed as completely as possible. But triethoxysilane has a relative high boiling point (~134° C.) and cannot be completely removed with heat and vacuum. This excess silane would affect the chemical and electrochemical properties of electrolytes. Since the prior art cross-linking relies on Si—O—C bond breaking and re-formation, the long term stability of this network is in question as these linkages are subject to hydrolysis. It is also a goal of the instant invention to avoid any unreacted acidified diethylene glycol that will introduce hydroxyl groups which would react with lithium metal. In addition, the catalyst used contains trace amount of water which should also be avoided. PAREL™ was used since it contains the required allyl groups and is commercially available. However, it is to be understood that the invention is not limited to PAREL™. FIG. 3 illustrates the cross-linking reaction for PPO-based electrolytes. Instead of using $H_2PtCl_6H_2O$, a common prior art hydrosilation catalyst, an organoplatinum complex, platinum-divinyltetramethyldisiloxane is used, as it contains no water contamination. A multifunctional silane compound, dimethyldisilylethane, was employed as cross-linker between allyl groups. This is a preferred cross-linker. Since the concentration of allyl groups in the electrolyte mixture is very low, four equivalents Si—H per allyl group were used to drive the cross-linking forward. The excess silane compound is relatively volatile (bp 98° C.) and can be removed readily under vacuum when cross-linking is terminated. The cross-linking involves the addition of Si—H to allyl groups to form Si—C bond, thus eliminating the formation of hydrolyzable Si—O—C linkages.

The cross-linking procedure is straightforward. PPO, silane compound, Pt catalyst, and LiTFSI were dissolved in dimethoxyethane and films were cast. A control solution containing only PAREL and LiTFSI was also made using the same solvent. Electrolyte films from these two sample solutions will be termed PPO-XL and PPO-NXL, respectively. Polymer film castings were performed on Teflon plates. It was observed that, compared with PPO-NXL, PPO-XL was less sticky, easier to pull off from Teflon plate, and mechanically stronger, suggesting that cross-linking had occurred. Another evidence of cross-linking is the solubility study: PPOXL was not soluble in dimethoxyethane-one of the best solvents for PPO.

Figure 4:
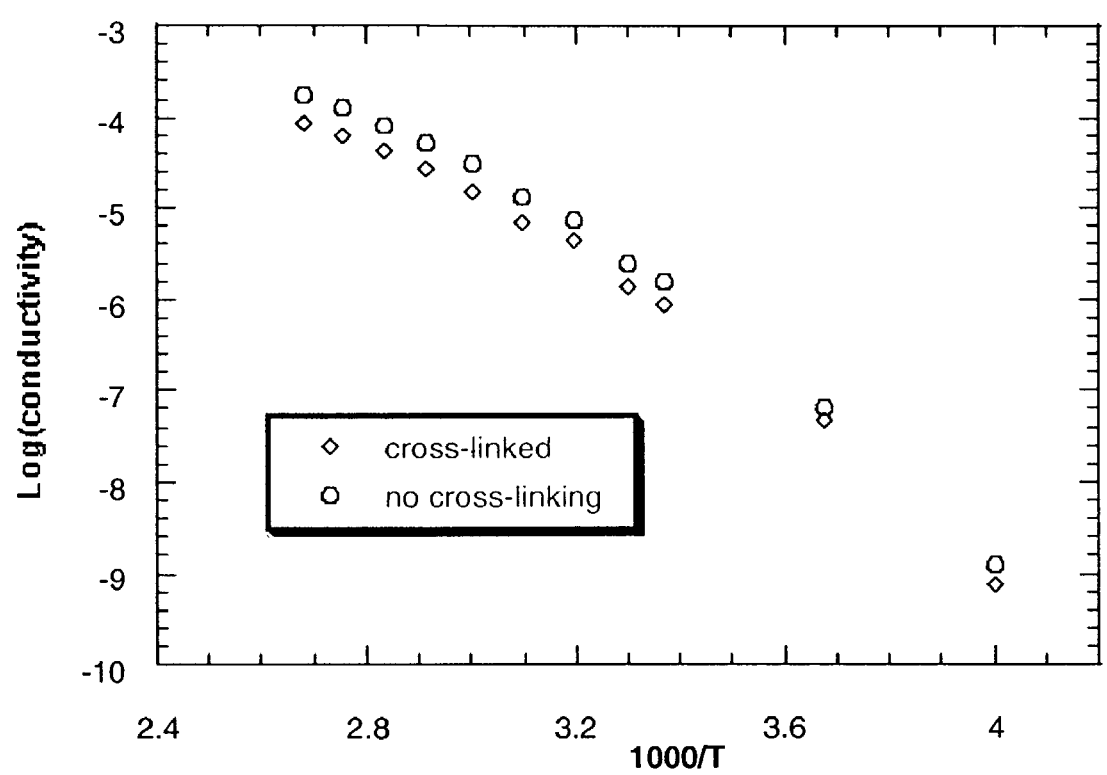

FIG. 4 shows the temperature dependence of the conductivity of the two polymer electrolytes. The conductivity of PPO-XL is virtually the same as that of PPO-NXL.

Figure 5:
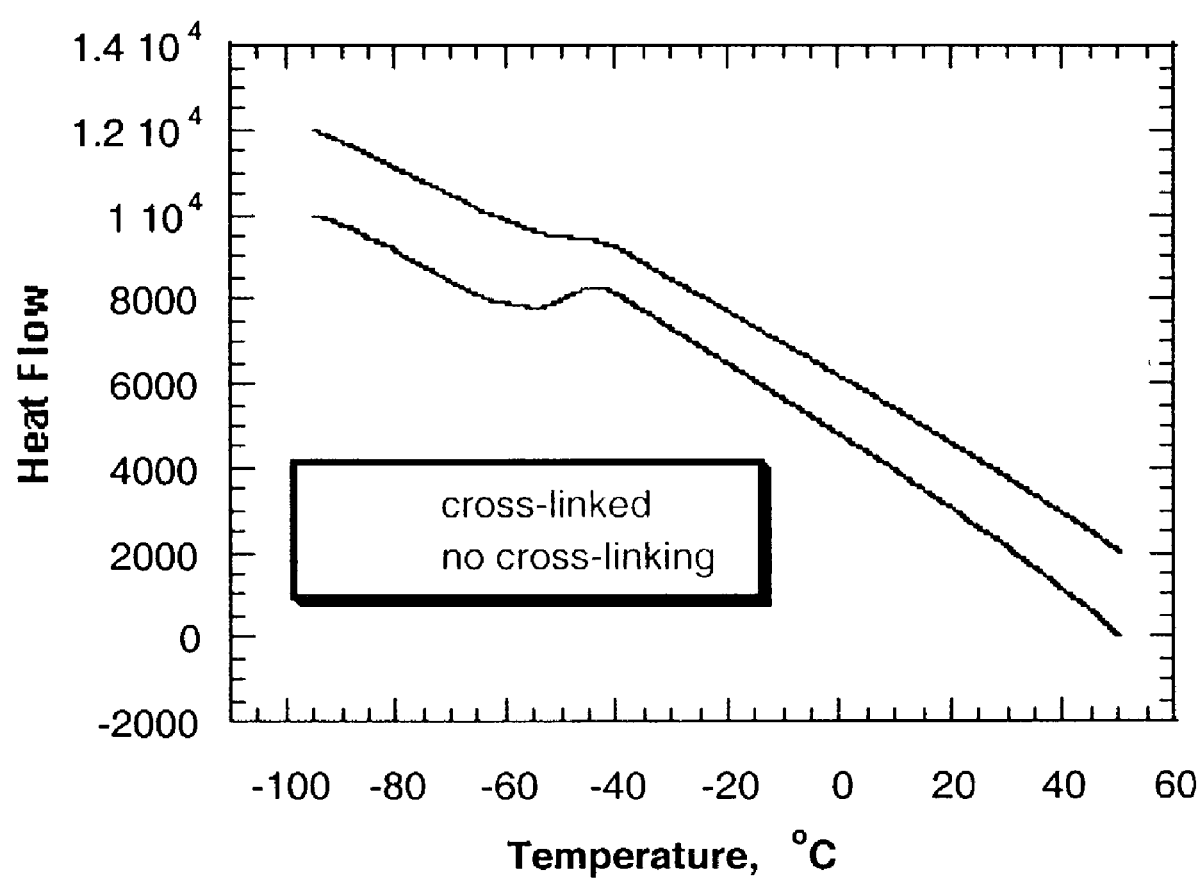

FIG. 5 shows DSC traces of samples PPO-NXL and PPO-XL. The glass transition temperatures for the two samples are essentially the same at −48° C. This suggests that the polymer segmental motion was not affected by cross-linking.

Figure 6:
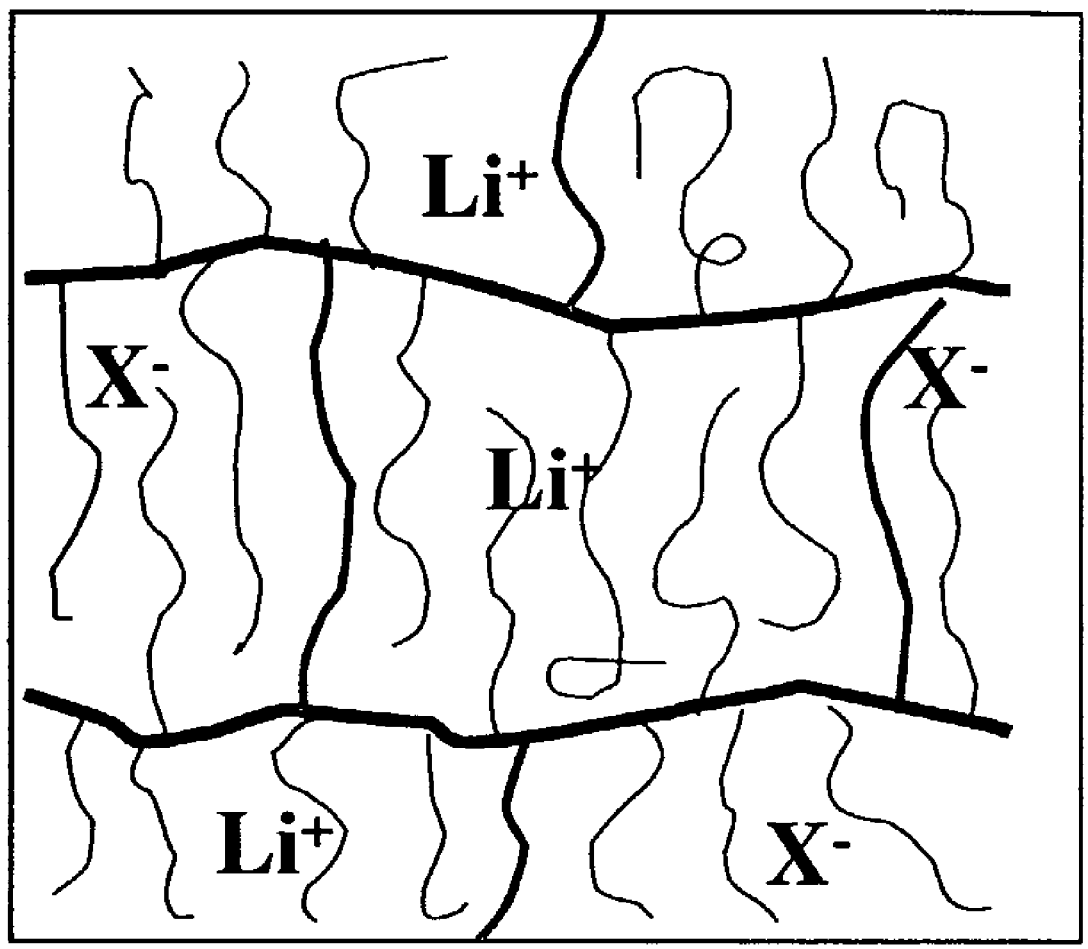
Figure 7:
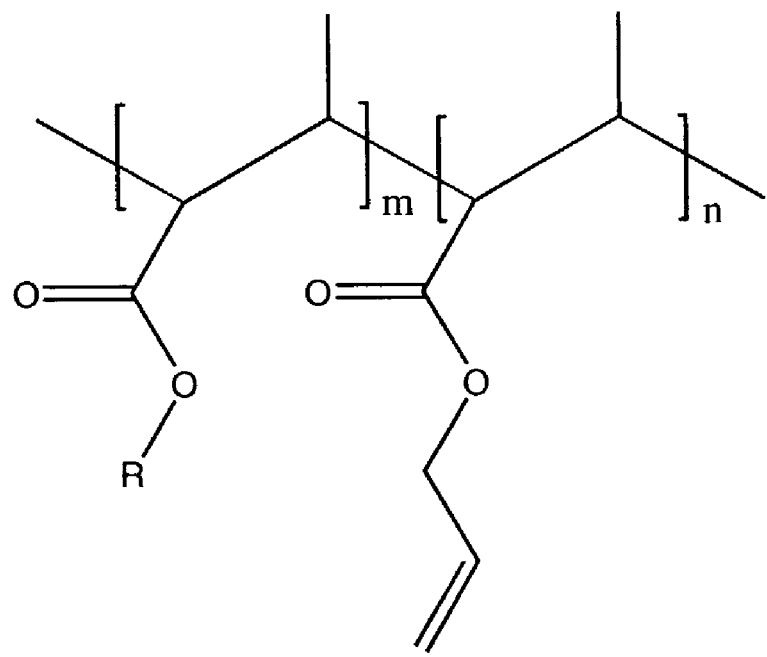
Figure 7:

FIG. 6 shows how the cross-linking of the instant invention may be used to produce a cross-linked network with good mechanical properties but with the ether structures responsible for ion transport still unrestricted in their segmental motion. This network structure is inherently more useful than linear polymer networks of the prior art where the ether units are in the backbone and hence constrained by the excessive cross-linking. Heavy horizontal lines represent the comb-branch backbone, heavier vertical lines the cross-links and the lighter vertical lines the solvating side-chains. Anions may be fixed to the side chains The instant invention also contemplates the use of allyl functional comb branch copolymers, as they generally are more conductive and therefore are better candidates for lithium rechargeable batteries. The use of polymethacrylate-based comb branch copolymers is practical because the two necessary monomers are available but the solution radical polymerization of such monomers has been well established. A general structure of the allyl functional comb-branch poly[methoxyoligo(oxyethylene)methacrylate-co-allyl-methacrylate]copolymers is given in FIG. 7. Three copolymers with varying concentrations of allyl groups (2, 5, and 10 mol %) were prepared. These polymers are generally liquid-like and therefore mechanically poor. Electrolytes were made and cross-linking was carried out in the same way as for PPO electrolytes. It was found that the polymer solution becomes more and more viscous upon addition of cross-linker and catalyst. The viscosity enhancement increases with allyl group concentration and was the most significant in the case of MA10. In fact, such a solution remains processable for only a short period of time after which a continuous gel forms. While all of the three cross-linked polymer electrolytes were able to form free-standing films, the mechanical strength of the films seems to be better when generated from polymers with more allyl functional groups.

Figure 8:
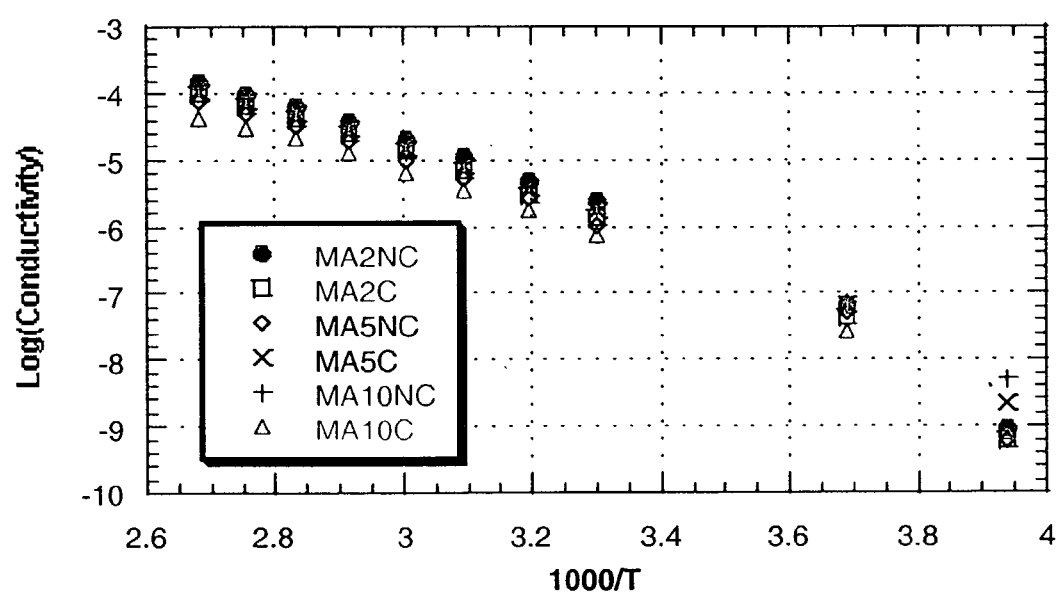

In order to investigate the effects of allyl groups and cross-linking, conductivity measurements were conducted using AC impedance spectroscopy and the data collected were plotted as shown in FIG. 8. It appears obvious that all the data points fall within a narrow conductivity band of about half order of magnitude. Therefore, it is safe to say that neither allyl group nor the cross-linking process caused significant decrease in conductivity. In addition to the conductivity studies, the inventors also carried out DSC thermal analysis. It turned out that all the electrolytes studies were amorphous. Table 1 lists the glass transition temperatures of these electrolytes along with their pristine polymers. It can be seen that the three allyl functional copolymers have similar glass transition temperatures. When LiTFSI salt was added, the Tg values go up by more than 13 degrees. However, the cross-linking does not seem to affect the glass transition of these polymers—a phenomenon also observed with PPO system.

TABLE 1

Glass Transition Temperatures of the comb branch copolymers and their salt complexes

|      | Original | With Salt | With Salt & XL |
|------|----------|-----------|----------------|
| MA2  | −58      | −43       | −46            |
| MA5  | −57      | −44       | −47            |
| MA10 | −59      | −44       | −43            |

While not wishing to be bound by any particular theory or principle, it is possible to explain the observed behavior. There have been numerous reports on the relationship between conductivity and cross-linking of polymer electrolytes. Some authors showed a severe conductivity penalty upon cross-linking, others were able to achieve good mechanical properties while maintaining high conductivity. There does not seem to have a general conclusion about this relationship, as different people work with different electrolyte systems. However, it has been generally accepted that the conductivity of polymer electrolytes can be described by the following relationship called Vogel-Tamman-Fulcher equation:

$$\sigma = AT^{-1/2}\exp(-B/(T-T_0))$$

where the A term is a constant proportional to the charge carriers, B is a constant, and $T_0$ is associated with glass transition temperature of polymer electrolytes. Based on this theory, it is reasonable to explain why the conductivity results are in good agreement with the glass transition temperatures of these electrolytes before and after cross-linking in both linear and comb branch copolymers discussed above.

EXAMPLES

Example 1

PAREL™, a commercially available polypropylene oxide (PPO), was obtained from Zeon Chemicals Inc., and has a weight and number average molecular weights of $5\times10^5$ and $2.5\times10^5$, respectively. This polymer was prepared from a mixture of propylene oxide (95 mole %) and allyl glycidyl ether (5 mole %) by using alkyl aluminum chloride as catalyst. The allyl groups were randomly distributed among polymer chains. To remove additives and the BHT radical inhibitor, the polymer was subjected to Soxhlet extraction with methanol for a week followed by drying at 65° C. using drying pistol in a $P_2O_5$ environment under vacuum for another week. LiTFSI was a gift from 3M and dried under vacuum at 180° C. overnight.

Allylmethacrylate and poly(ethylene glycol)methyl ether methacrylate having an average molecular weight of 300 (PEGDME-300) were purchased from Aldrich and were purified using an inhibitor remover (Aldrich, diposable column) and stored in a freezer. The radical initiator, 2,2'-Azabisisobutyronitrile (AIBN), was purchased from Aldrich and re-crystallized twice using methanol. THF was dried by distillation over calcium hydride. Dimethoxyethane was dried by running it through an activated alumina (ICN Alumina N, Super I) column prior to use. Dimethyldisilylethane and 3–3.5% platinum-divinyltetramethyldisiloxane complex were purchased from Gelest and were used as received. Electrolyte preparation, film casting, and cell assembly were carried out in dry glovebox.

All comb branch methacrylate copolymers were prepared by radical polymerization in THF solution in the same way. The following example shows a procedure for the preparation of such a copolymer with 10 mol % of allyl groups: To a 250 mL of RBF, equipped with a cooling condenser, were added PEGMEM-300 (20 g, 0.067 mol), Allyl methacrylate (0.95 g, 0.0074 mol), AIBN (16 mg), and THF (80 mL). Polymerization reaction was carried out at 65° C. in an Ar atmosphere for 2 days. The crude polymer solution was precipitated into heptane. After removing the solvent, it was further purified by two fractionations using THF/heptane combination. The final product was dried under high vacuum overnight. The weight average molecular weight is in the order of $10^5$.

Polymer electrolyte solutions were prepared by dissolving the polymers and the required amounts of LiTFSI (so that O/Li=20) in dimethoxyethane. In the case of cross-linked electrolytes, equivalent amount of dimethyldisilylethane (based on allyl group) and platinum-divinyltetramethyldisiloxane complex were added to the above mixture. Typically, the concentration of Pt catalyst were kept around $10^{-4}$ M. These solutions were stirred for a few minutes and then cast onto Teflon plate. The films were allowed to dry in the dry glovebox overnight followed by evacuation in a high vacuum chamber. These films had a thickness of about 200 μm.

Example 2

For the preparation of a monomer EPE2, Diethylene glycol monomethyl ether (Aldrich, 95%), 50.61 g (0.40 mol), Sodiumhydride (Aldrich, 95%), 12.12 g (0.48 mol), Epichlorohydrin (Aldrich, 99%), 74.02 g (0.80 mol) and THF (B&J, dried with $CaH_2$), 350 ml were used. Two parallel reactions were performed in 500 ml flasks. After the usual work-up, the product was purified by vacuum distillation. About 120 ml EPE2 (95% purity) was collected at ~50° C./50 mtorr. It was then dried with $CaH_2$ overnight and distilled again, yielding ~100 ml final product. GC (EPE20003.D):purity ~97%, rt:14.01 min.

All other epoxide monomers with different number of ethyleneoxide unit, n=3, 4, 5, were prepared in the same Manner. The structure and purity were double checked by GC and NMR spectra.

Preparation of Crosslinkable Comb-branch Polyepoxides

Poly(2-(2-methoxyethoxy)ethyl glycidyl ether-co-allyl glycidyl ether), PEPE2 with 5% of allyl group. Other polymers with different side-chain length were synthesized and purified in the same way. Monomer EPE2 (98% purity), 30 ml (0.2 mol), Potassium tert-butoxide, 3 ml of 1M solution in THF (Aldrich)($3.0 \times 10^{-3}$ mol), Allyl glycidyl ether (Aldrich, 99%), 1.2 ml (0.01 mol), Chain extender, 1,2,7,8-diepoxyoctane (Aldrich, 97%), 1.4 g (0.01 mol). A 200 ml flask with a side arm equipped with a high vacuum stopcock was treated by vacuum-Nitrogen purging several times and baked a few minutes using propane blaze before it was transfer to an oil bath which was preset at the desired temperature (67±3° C.). Monomer, chain extender, allyl glycidl ether, and initiator were then loaded in that order by using gas tight lure lock syringe. After 3 days, the reaction was quenched with methanol. The polymer was fractionated using methanol and ether as solvent and hexane precipitating solvent, respectively. The polymer was dried under vacuum for 3 days at 67° C. before it was washed with DI water to remove residue base. The polymer was recover by extracting aqueous solution with dichloromethane/diethyl ether (3/1, v/v). The slightly yellowish polymer was dried at 90° C. under vacuum (50 mtorr) for 3 days, it appeared to be viscous liquid.

Hydrosilylation Formulation and Film Casting

The formulation and cross-linking reaction were performed in the grove-box. After polymer and salt were solublized in 4 ml glyme, Platinum catalyst and then 1,4-dimethyldisilethane were added subsequently. The solution was stirred for about 20 hr before casting the films on Teflon coated substrate. After drying in the anti-chamber for 24 hr, transparent free-standing films were obtained.

Impedance measurements on crosslinked (PEPE2X) and non-crosslinked (PEPE2) polymer electrolytes were performed on SS/SPE/SS symmetrical cells using stainless steal block electrodes and 78μ PDFE spacer. The cells were annealed at 80° C. overnight before the measurements on impedance from −5° C. to 110° C.

A HPLC system (Rainin Instrument) fitted with a GPC column and a RI detector was used to measure the molecular weights of polymers. DMF and polystyrenes were employed as the eluting solvent and standards, respectively. Differential Scanning Calorimetry (DSC, Perkin-Elmer DSC-7) was employed for thermal analysis of polymer electrolytes over a temperature range of −100 to 50° C. in a helium atmosphere. Samples were quenched to −100° C. at 200° C./min and heated to 50° C. at a scan rate of 10° C./min The conductivity data were collected using Solartron™ SI 1254 analyzer and 1286 electrochemical interface. A PVDF KYNAR spacer of 76 μm was employed to control the thickness of the electrolytes. Two stainless-steel discs were utilized as blocking electrodes for conductivity measurements. Cells were equilibrated overnight in a convection oven at 85° C. and then were cooled down to room temperature where measurements were taken at 10° intervals up to 100° C. A stainless steel disc coupled with a lithium disc was used for cyclic voltammetry experiments.

Table 2 illustrates the results for different formulations for PEPE2/LiTFSI polymer electrolytes and Table 3 illustrates results for different formulations for PEPE4/LiTFSI polymer electrolytes in 2 ml THF.

TABLE 21

| Formulation for PEPE2/LiTFSI polymer electrolytes | | | | |
|---|---|---|---|---|
| SPE(O/Li) | Polymer(g) | LiTFSI(g) | 1,4-dimethyldisilethane(ml) | Pt catalyst(10:1 diluted) |
| 5 | 0.878 | 1.122 | 0.022 | 10DP |
| 10 | 1.222 | 0.788 | 0.022 | 10 |
| 20 | 1.516 | 0.484 | 0.022 | 10 |
| 40 | 1.724 | 0.276 | 0.022 | 10 |
| 80 | 1.852 | 0.148 | 0.022 | 10 |

TABLE 3

Formulation for PEPE4/LiTFSI polymer electrolytes in 2 ml THF

| SPE(O/Li) | Polymer(g) | LiTFSI(g) | Tetramethyldisiloxane(μm) | Pt catalyst(10:1 diluted), drop |
|---|---|---|---|---|
| 5 | 0.434 | 0.566 | 13 | 5 |
| 10 | 0.605 | 0.395 | 18 | 6 |
| 20 | 0.754 | 0.246 | 23 | 7 |
| 40 | 0.860 | 0.140 | 26 | 8 |
| 80 | 0.925 | 0.075 | 28 | 9 |

Figure 9:
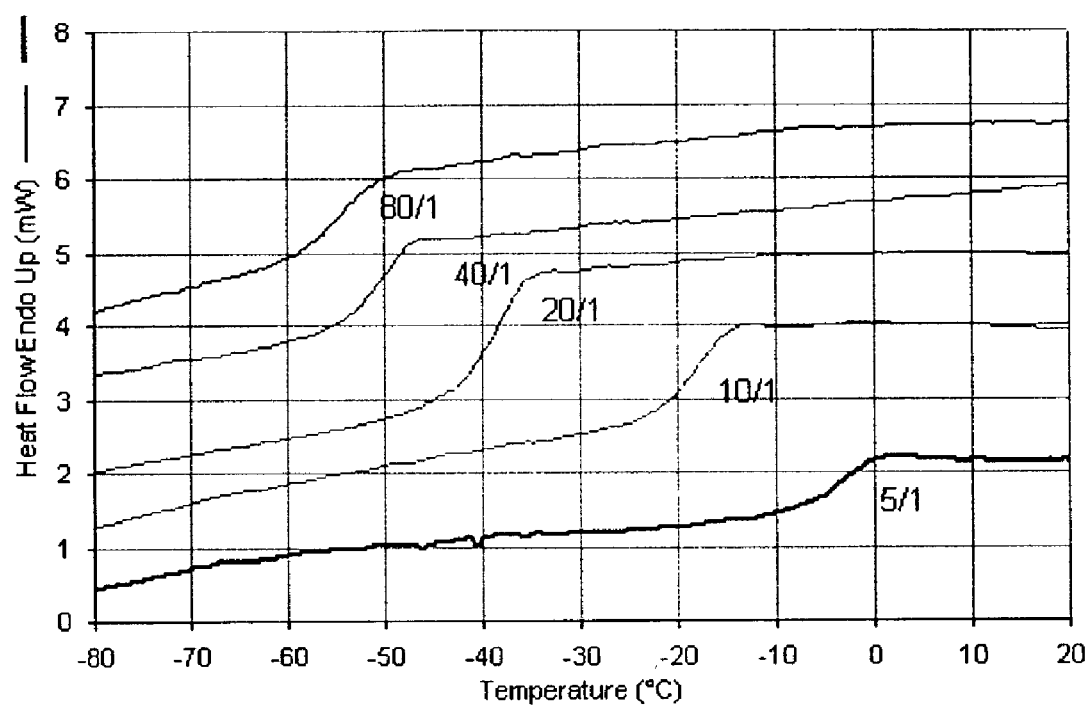
Figure 10:
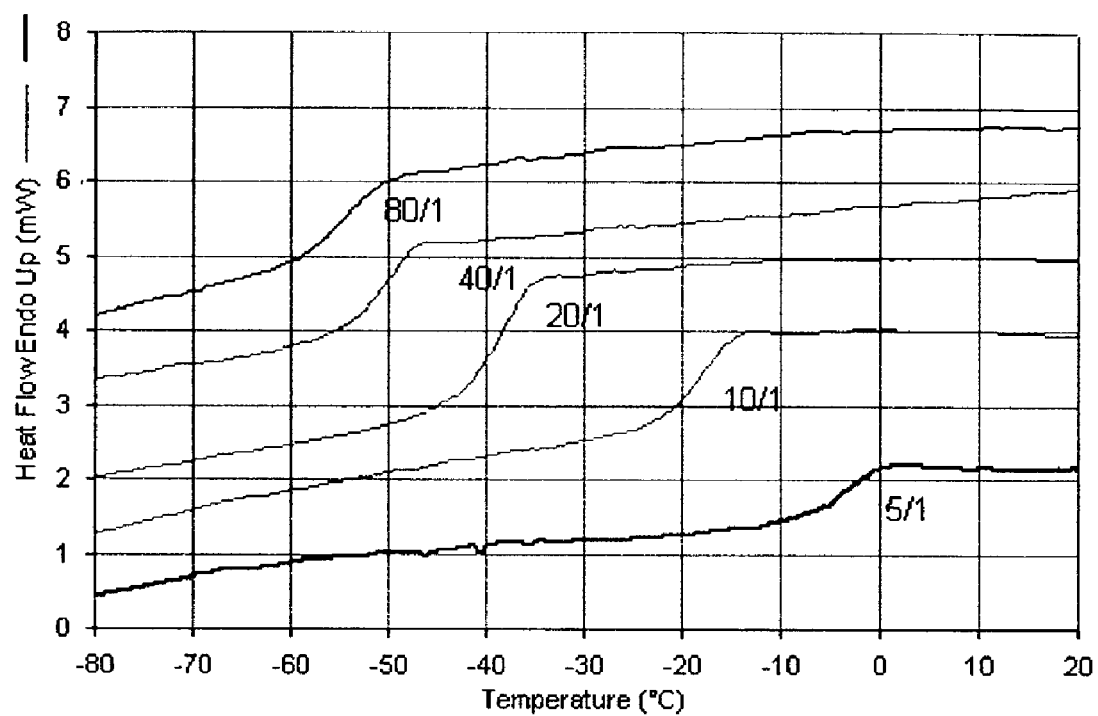
Figure 11:
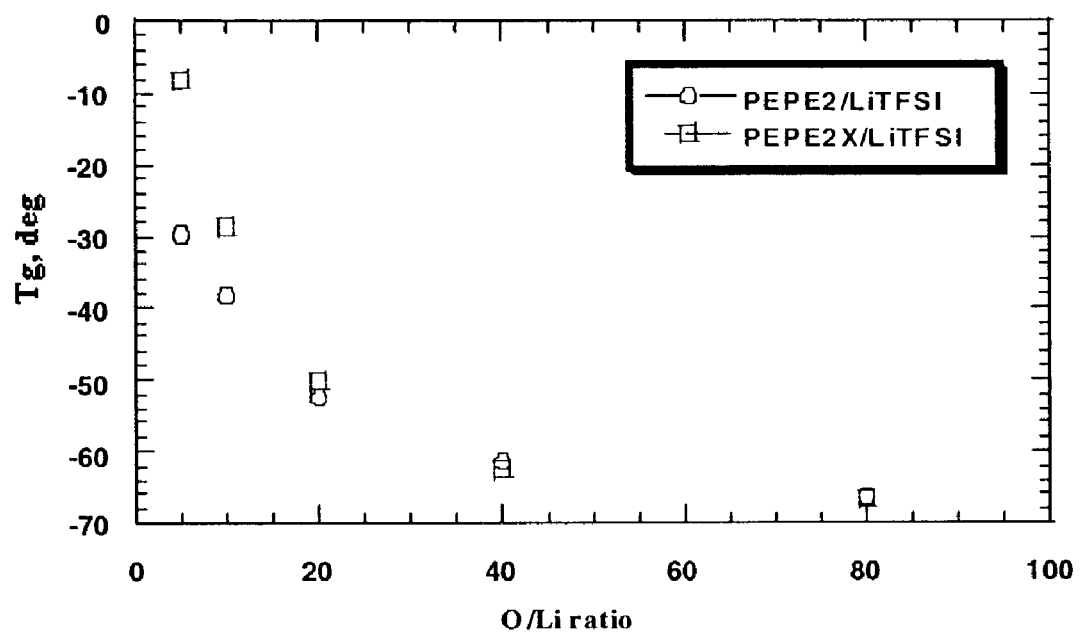

Glass transition and conductivity FIGS. 9 and 10 show the DSC heating scans for PEPE2/LiTFSI and PEPE2X/LiTFSI polymer electrolytes. It is clear that Tg increases with the increase of salt concentration, which is a typical feature of solid polymer electrolytes. Compared to the non-crosslinked polymer electrolytes, inorganic salt has more significant impact on Tg (FIG. 11) for the crosslinked polymer electrolytes analogues, especially at high salt concentration. This result suggested that the ionic interactions which provide physical crosslinking are more effective on the restriction of segmental motion in crosslinked polymer than non-crosslinked counterparts. While not wishing to be bound by any particular theory, it is possible that this may due to the increased crosslinking density and the development of network structure as evidenced by the fact that the polymer becomes insoluble in common organic solvents.

Figure 12:
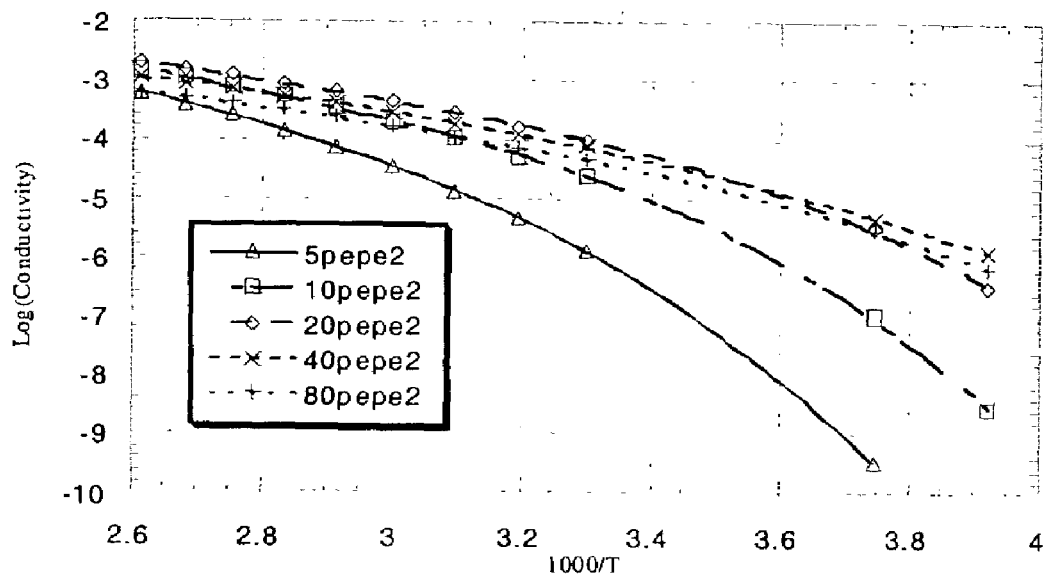
Figure 13:
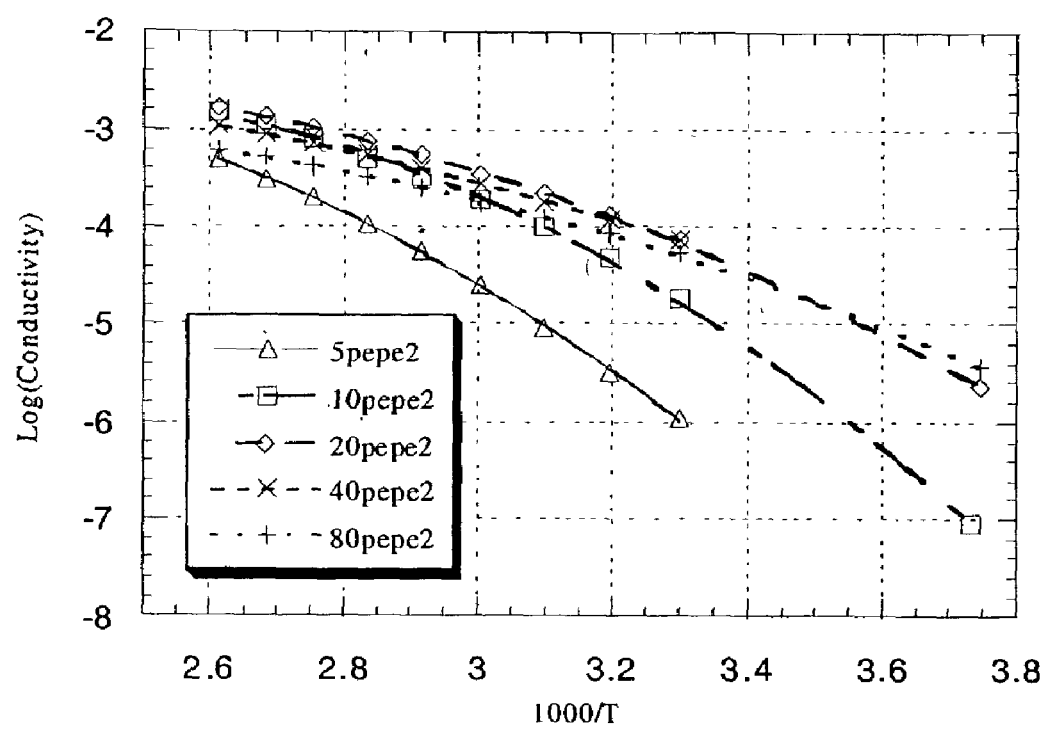
Figure 14:
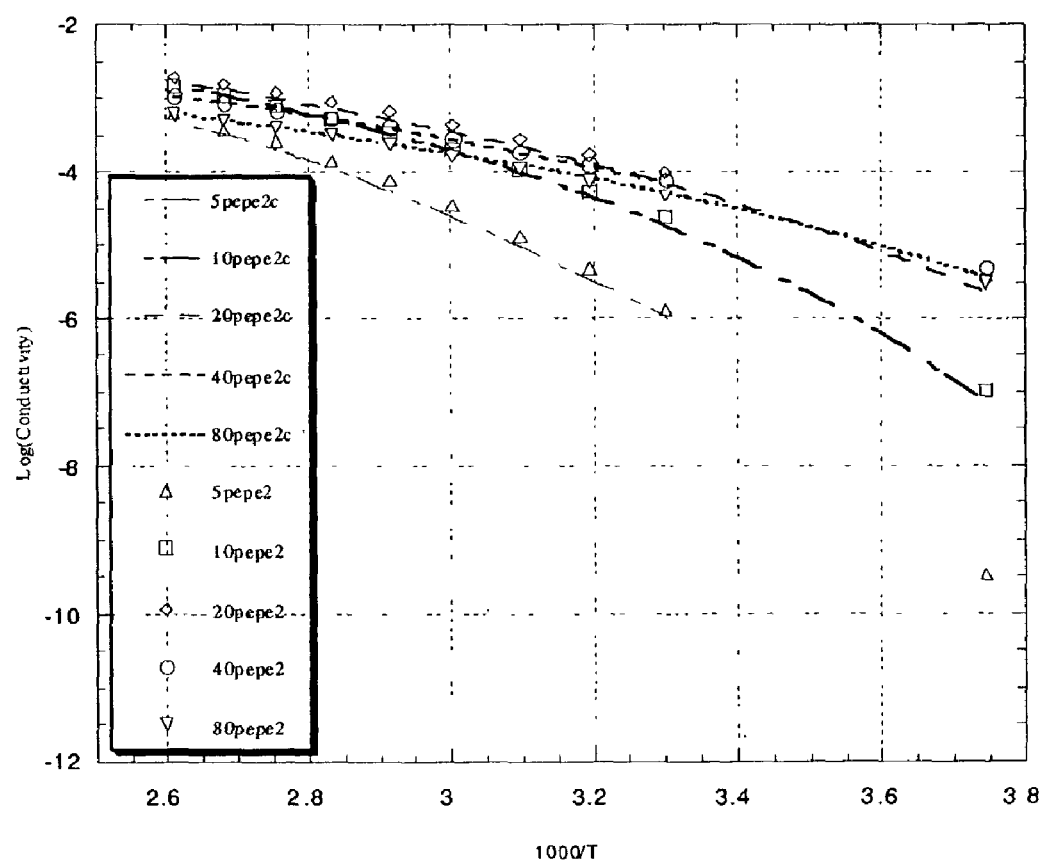

The conductivity of LiTFSi polymer electrolytes, both crosslinked and noncrosslinked are measured at the same time using 75 um spacer and stainless-steal blocking electrodes. The results are shown in FIGS. 12 and 13. The conductivity behavior in both cases, is very similar, the best conductivity about $1.0 \times 10^{-4}$ S/cm$^2$, was observed for the O/Li ratio of 20/1 at ambient temperatures. Interestingly, the conductivity values are very close for crosslinked and non-crosslinked polymer, the fitting curves for PEPE2X/LiTFSI fit quit well with the data of PEPE2/LiTFSI (FIG. 14), even for the high concentration samples exhibiting big difference in Tg (O/Li=5, 10). The results indicate that the conductivity is not directly correlated with glass transition in this case. The segmental motion of side chains plays a major role in ion transportation in this type of comb-branch polymer. Branched polymers offer properties that are significantly different than higher molecular linear chains since chain entanglements are limited and end-groups have significant influence on properties. Thus, high conductivity and durable mechanical properties can be realized at the same time by using comb-branch polymers with flexible backbone structures followed by appropriate cross-linking.

Figure 15:
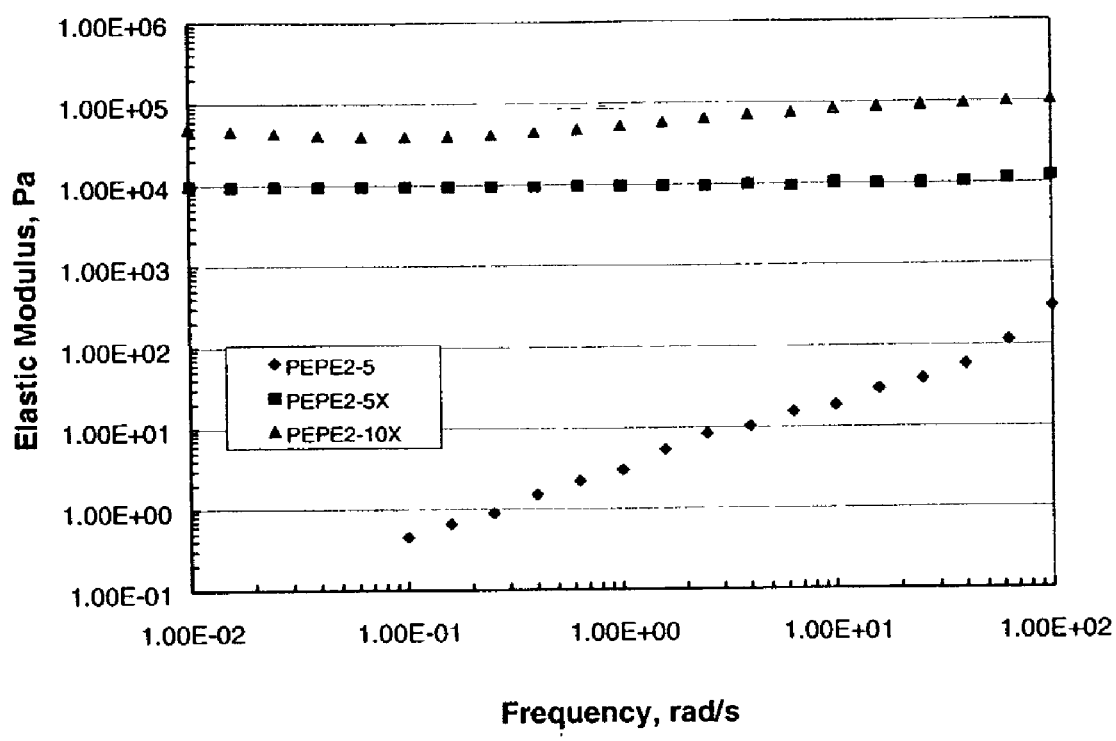
Figure 16:
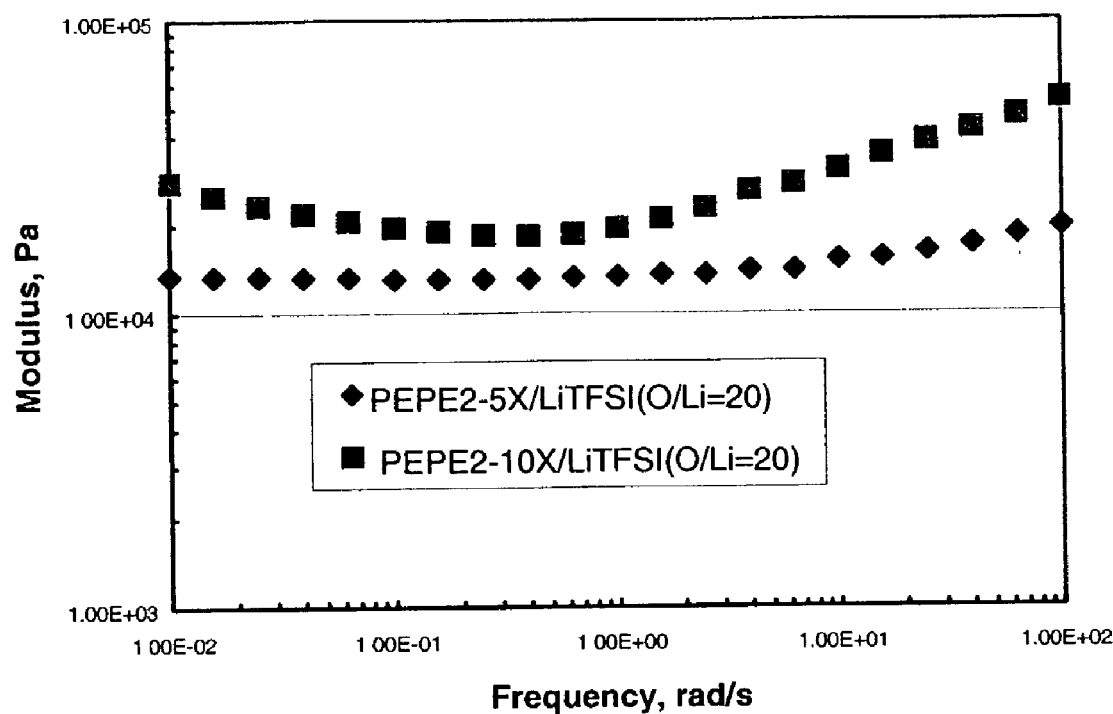

FIGS. 15 and 16 show initial measurements of the elastic moduli of the cross-linked films. In FIG. 15, a non cross-linked polymer is shown for comparison and in FIG. 16, polymers with added salt are shown. The measurements were made in ambient air. It is not known whether the absorption of moisture from the atmosphere affects the measurements although it is possible that the presence of the salt may alter the curing reaction as may be suspected from the lower modulus observed for the 10% cross-linked material in FIG. 16.

Figure 17:
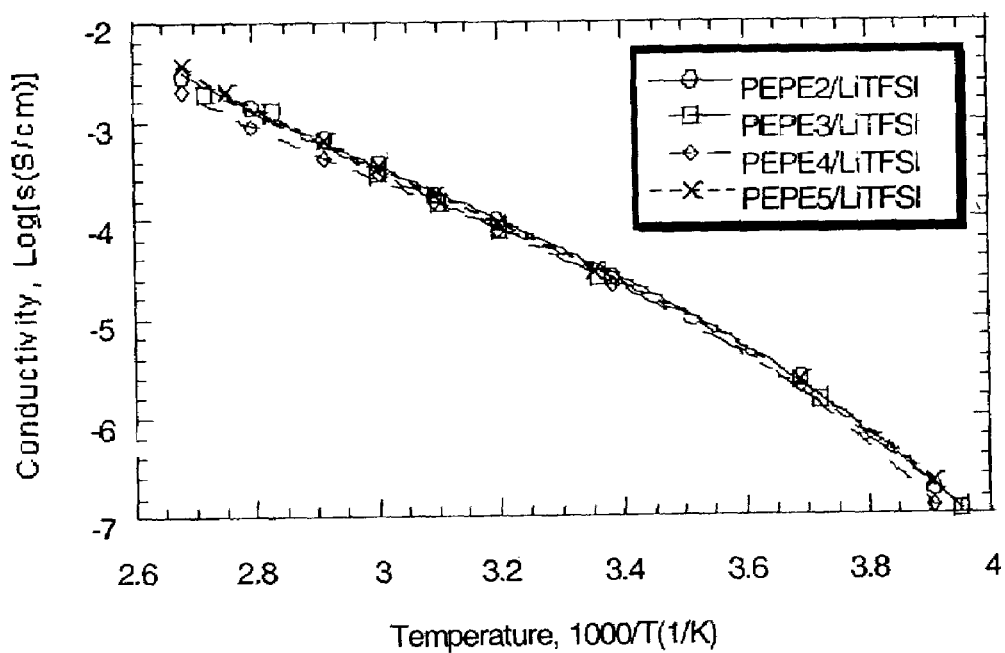
FIG. 17 Conductivities of PEPE polymers with different side chain lengths

FIG. 17 shows the trend of conductivity as a function of temperature, no significant effect upon the conductivity was observed by changing the ether side chain length with the polyepoxide family.

These results illustrate several points about the invention. The silane or siloxane reaction may be used to graft groups on to pre-polymers that are designed with a reactive allyl group. The graft reaction can be carried out in a manner that is quite clean and which can be improved by further purification of the polymer. The grafting reaction is very controllable and involves no other groups than the introduced allyl groups, though the instant invention is not so limited. Attachment of the anion to a longer chain leads to higher conductivities. Comparison with polyelectrolytes prepared with the same anion that was bound to a much shorter side chain shows that the conductivity is higher for the longer side-chain polymer. Variation of the concentration of the anion in the polyelectrolyte leads to an optimum conductivity. Direct comparison of the low lattice energy anion, $(CF_3SO_2)_2C$—Si ~ with a sulfonate anion bound in a similar fashion is inconclusive. The conductivities of the two polyelectrolytes are similar.

Although the foregoing invention has been described in some detail for purposes of clarity of understanding, those skilled in the art will appreciate that various adaptations and modifications of the just described preferred embodiments can be configured without departing from the scope and spirit of the invention. Moreover, the described processing distribution and classification engine features of the present invention may be implemented together or independently. Therefore, the described embodiments should be taken as illustrative and not restrictive, and the invention should not be limited to the details given herein but should be defined by the following claims and their full scope of equivalents. Further, it is to be understood that all references and patents cited herein are expressly incorporated herein by reference.

We claim:

1. A polymeric electrolyte structure, comprising:
   a comb-branch polymer having a plurality of unconjugated side chains,
     wherein the comb-branch polymer is crosslinked with a silane compound such that a plurality of Si—H bonds are coupled to the plurality of unconjugated side chains,
     wherein the silane compound has a boiling point low enough to remove excess silane compounds from the crosslinked comb-branch polymer by vacuum, and
     wherein the polymer is selected from the group consisting of a comb-branch polytetrahydrofuran ether, a comb-branch polyepoxide ether, a comb-branch polyvinyl ether, a comb-branch polyacrylate ether and a comb-branch polystyrene ether.

2. The polymeric electrolyte structure of claim 1 wherein the comb-branch polyepoxide ether has the following structure:

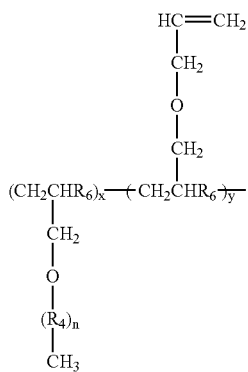

wherein $R_4$ comprises —$(CH_2CH_2O)$—, —$(CH_2CH_2CH_2O)$—, —$(CH_2CH_2CH_2CH_2O)$—, —$(CH_2CHR_5O)$—, where $R_5$ is $CH_3$—, $CH_3O$— or $CH_3OCH_2CH_2O$—, where $R_6$ is —$CH_2$, O, NH, Si or P, n is an integer from about 2 to about 20, and x and y are chosen such that the ratio x/y is from 1 to 30.

3. The polymeric electrolyte structure of claim 2, wherein the ratio x/y is less than or equal to 20.

4. The polymeric electrolyte structure of claim 3, wherein the ratio x/y is 1, 2.5, 5 or 10.

5. The polymeric electrolyte structure of claim 2, wherein n is between 2 and 7.

6. The polymeric electrolyte structure of claim 1, wherein the silane compound is chosen from the group consisting of:

7. The polymeric electrolyte structure of claim 1, wherein the silane compound is

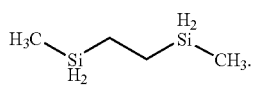

8. The polymeric electrolyte structure of claim 1, wherein the silane compound has a boiling point that is less than 140° C.

9. The polymeric electrolyte structure of claim 1, wherein the silane compound has a boiling point that is less than 100° C.

* * * * *